(12) United States Patent
Vogel et al.

(10) Patent No.: US 8,289,182 B2
(45) Date of Patent: Oct. 16, 2012

(54) METHODS AND SYSTEMS FOR VIRTUAL ENERGY MANAGEMENT DISPLAY

(75) Inventors: William Steven Vogel, San Carlos, CA (US); Michel Veillette, Waterloo (CA); Victor Edward Magnotti, Sausalito, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 926 days.

(21) Appl. No.: 12/275,258

(22) Filed: Nov. 21, 2008

(65) Prior Publication Data

US 2010/0127889 A1 May 27, 2010

(51) Int. Cl.
*G08B 23/00* (2006.01)
*G08C 19/10* (2006.01)

(52) U.S. Cl. .............................. 340/870.02; 340/870.11

(58) Field of Classification Search ............. 340/870.11, 340/870.02; 700/291, 295
See application file for complete search history.

(56) References Cited

U.S. PATENT DOCUMENTS

| | | | |
|---|---|---|---|
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,254,472 A | 3/1981 | Juengel et al. | 364/900 |
| 4,322,842 A | 3/1982 | Martinez | 370/11 |
| 4,396,915 A | 8/1983 | Farnsworth et al. | 340/870.03 |
| 4,425,628 A | 1/1984 | Bedard et al. | 364/900 |
| 4,638,314 A | 1/1987 | Keller | 340/870.02 |
| 4,644,320 A | 2/1987 | Carr et al. | 340/12.37 |
| 4,749,992 A | 6/1988 | Fitzmeyer et al. | 340/870.02 |
| 4,792,946 A | 12/1988 | Mayo | 370/245 |
| 4,939,726 A | 7/1990 | Flammer et al. | 370/400 |
| 5,007,052 A | 4/1991 | Flammer | 370/389 |
| 5,056,107 A | 10/1991 | Johnson et al. | 375/138 |
| 5,077,753 A | 12/1991 | Grau, Jr. et al. | 375/141 |
| 5,079,768 A | 1/1992 | Flammer | 370/349 |
| 5,115,433 A | 5/1992 | Baran et al. | 370/400 |
| 5,117,422 A | 5/1992 | Hauptschein et al. | 370/255 |
| 5,130,987 A | 7/1992 | Flammer | 370/436 |

(Continued)

FOREIGN PATENT DOCUMENTS

EP 0 578 041 B1 11/1999

(Continued)

OTHER PUBLICATIONS

Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.

(Continued)

*Primary Examiner* — Michael Rutland Wallis
(74) *Attorney, Agent, or Firm* — Dawn-Marie Bey; King & Spalding LLP (57) ABSTRACT

A method and system of virtual energy management display involves periodically receiving via a mesh local area network electronic data representing energy management-related information by a RF communication-enabled memory storage device coupled to an electronic display device within a home area network. Electronic data representing telemetry information is likewise periodically received by the RF communication-enabled memory storage device from at least one RF communication-enabled energy management-related device within the home area network. The electronic data is converted to a common format by an application running at least in part on the memory storage device and displayed on a screen associated with the display device.

14 Claims, 4 Drawing Sheets

U.S. PATENT DOCUMENTS

| | | | | |
|---|---|---|---|---|
| 5,138,615 A | 8/1992 | Lamport et al. ............. 370/94.3 |
| 5,159,592 A | 10/1992 | Perkins ........................ 370/338 |
| 5,216,623 A | 6/1993 | Barrett et al. ................. 364/550 |
| 5,276,680 A | 1/1994 | Messenger ................... 370/311 |
| 5,311,581 A | 5/1994 | Merriam et al. ......... 379/106.07 |
| 5,400,338 A | 3/1995 | Flammer, III et al. ........ 370/255 |
| 5,430,729 A | 7/1995 | Rahnema ...................... 370/409 |
| 5,432,507 A | 7/1995 | Mussino et al. .......... 340/870.03 |
| 5,453,977 A | 9/1995 | Flammer, III et al. ........ 370/254 |
| 5,459,727 A | 10/1995 | Vannucci ...................... 370/332 |
| 5,463,777 A | 10/1995 | Bialkowski et al. .................. 1/1 |
| 5,465,398 A | 11/1995 | Flammer ........................ 455/69 |
| 5,467,345 A | 11/1995 | Cutler, Jr. et al. ............. 370/229 |
| 5,471,469 A | 11/1995 | Flammer, III et al. ........ 370/346 |
| 5,479,400 A | 12/1995 | Dilworth et al. ............. 370/331 |
| 5,488,608 A | 1/1996 | Flammer, III ................ 370/400 |
| 5,515,369 A | 5/1996 | Flammer, III et al. ........ 370/480 |
| 5,515,509 A | 5/1996 | Rom ............................. 709/228 |
| 5,528,507 A | 6/1996 | McNamara et al. ............ 700/286 |
| 5,544,036 A | 8/1996 | Brown, Jr. et al. ............. 364/145 |
| 5,553,094 A | 9/1996 | Johnson et al. ................ 375/130 |
| 5,570,084 A | 10/1996 | Ritter et al. ................... 370/338 |
| 5,572,528 A | 11/1996 | Shuen ........................... 370/402 |
| 5,596,722 A | 1/1997 | Rahnema ...................... 709/241 |
| 5,608,721 A | 3/1997 | Natarajan et al. ............. 370/238 |
| 5,608,780 A | 3/1997 | Gerszberg et al. ............. 455/436 |
| 5,623,495 A | 4/1997 | Eng et al. ...................... 370/397 |
| 5,659,300 A | 8/1997 | Dresselhuys et al. .... 340/870.02 |
| 5,673,252 A | 9/1997 | Johnson et al. ................ 370/449 |
| 5,696,501 A | 12/1997 | Ouellette et al. ......... 340/870.02 |
| 5,717,718 A | 2/1998 | Rowsell et al. ................ 375/260 |
| 5,719,564 A | 2/1998 | Sears ........................ 340/870.02 |
| 5,726,644 A | 3/1998 | Jednacz et al. ............ 340/825.52 |
| 5,727,057 A | 3/1998 | Emery et al. ............. 379/201.07 |
| 5,737,318 A | 4/1998 | Melnik ......................... 370/254 |
| 5,740,366 A | 4/1998 | Mahany et al. ............... 709/227 |
| 5,748,104 A | 5/1998 | Argyroudis et al. ..... 340/870.11 |
| 5,757,783 A | 5/1998 | Eng et al. ...................... 370/315 |
| 5,758,331 A | 5/1998 | Johnson ....................... 705/412 |
| 5,761,083 A | 6/1998 | Brown, Jr. et al. ............. 364/492 |
| 5,767,790 A | 6/1998 | Jovellana ................. 340/870.02 |
| 5,774,660 A | 6/1998 | Brendel et al. ................ 709/201 |
| 5,812,531 A | 9/1998 | Cheung et al. ................ 370/255 |
| 5,822,309 A | 10/1998 | Ayanoglu et al. ............. 370/315 |
| 5,844,893 A | 12/1998 | Gollnick et al. ............... 370/329 |
| 5,874,903 A | 2/1999 | Shuey et al. .............. 340/870.02 |
| 5,880,677 A | 3/1999 | Lestican ................... 340/825.06 |
| 5,892,758 A | 4/1999 | Argyroudis ................... 370/335 |
| 5,894,422 A | 4/1999 | Chasek .................... 364/528.26 |
| 5,896,097 A | 4/1999 | Cardozo ................... 340/870.03 |
| 5,898,387 A | 4/1999 | Davis et al. .............. 340/870.02 |
| 5,898,826 A | 4/1999 | Pierce et al. ..................... 714/4 |
| 5,901,067 A | 5/1999 | Kao et al. ......................... 700/11 |
| 5,903,566 A | 5/1999 | Flammer, III ................ 370/406 |
| 5,914,672 A | 6/1999 | Glorioso et al. .......... 340/870.02 |
| 5,914,673 A | 6/1999 | Jennings et al. .......... 340/870.03 |
| 5,920,697 A | 7/1999 | Masters et al. ................ 709/219 |
| 5,926,531 A | 7/1999 | Petite ........................ 379/144.04 |
| 5,933,092 A | 8/1999 | Ouellette et al. ......... 340/870.02 |
| 5,953,371 A | 9/1999 | Rowsell et al. ................ 375/220 |
| 5,963,146 A | 10/1999 | Johnson et al. .......... 340/870.01 |
| 5,963,457 A | 10/1999 | Kanoi et al. .............. 364/528.26 |
| 5,974,236 A | 10/1999 | Sherman ....................... 709/221 |
| 5,986,574 A | 11/1999 | Colton ..................... 340/870.02 |
| 5,987,011 A | 11/1999 | Toh .............................. 370/331 |
| 5,991,806 A | 11/1999 | McHann, Jr. ................. 709/224 |
| 6,014,089 A | 1/2000 | Tracy et al. .............. 340/870.02 |
| 6,018,659 A | 1/2000 | Ayyagari et al. .............. 455/431 |
| 6,026,133 A | 2/2000 | Sokoler ........................ 375/365 |
| 6,028,522 A | 2/2000 | Petite ........................... 340/641 |
| 6,044,062 A | 3/2000 | Brownrigg et al. ........... 370/238 |
| 6,058,355 A | 5/2000 | Ahmed et al. .................. 702/62 |
| 6,061,609 A | 5/2000 | Kanoi et al. .................. 700/291 |
| 6,073,169 A | 6/2000 | Shuey et al. .................. 709/217 |
| 6,075,777 A | 6/2000 | Agrawal et al. .............. 370/329 |
| 6,078,785 A | 6/2000 | Bush ............................... 455/7 |
| 6,084,867 A | 7/2000 | Meier ........................... 370/338 |
| 6,088,659 A | 7/2000 | Kelley et al. ................... 702/62 |
| 6,097,703 A | 8/2000 | Larsen et al. .................. 370/254 |
| 6,108,699 A | 8/2000 | Moiin ........................... 709/221 |
| 6,118,269 A | 9/2000 | Davis ............................ 324/110 |
| 6,122,603 A | 9/2000 | Budike, Jr. .................... 702/182 |
| 6,124,806 A | 9/2000 | Cunningham et al. ... 340/870.02 |
| 6,134,587 A | 10/2000 | Okanoue ....................... 709/222 |
| 6,137,423 A | 10/2000 | Glorioso et al. .......... 340/870.02 |
| 6,150,955 A | 11/2000 | Tracy et al. .............. 340/870.02 |
| 6,169,979 B1 | 1/2001 | Johnson ....................... 705/412 |
| 6,172,616 B1 | 1/2001 | Johnson et al. .......... 340/870.12 |
| 6,195,018 B1 | 2/2001 | Ragle et al. .............. 340/870.01 |
| 6,218,953 B1 | 4/2001 | Petite ........................... 340/641 |
| 6,233,327 B1 | 5/2001 | Petite ........................... 379/155 |
| 6,239,722 B1 | 5/2001 | Colton et al. ............ 340/870.02 |
| 6,240,080 B1 | 5/2001 | Okanoue et al. .............. 370/338 |
| 6,246,677 B1 | 6/2001 | Nap et al. ..................... 370/346 |
| 6,246,689 B1 | 6/2001 | Shavitt ......................... 370/406 |
| 6,249,516 B1 | 6/2001 | Brownrigg et al. ........... 370/338 |
| 6,298,053 B1 | 10/2001 | Flammer, III et al. ........ 370/349 |
| 6,300,881 B1 | 10/2001 | Yee et al. .................. 340/870.02 |
| 6,304,556 B1 | 10/2001 | Haas ............................. 370/254 |
| 6,311,105 B1 | 10/2001 | Budike, Jr. .................... 700/291 |
| 6,338,087 B1 | 1/2002 | Okanoue ....................... 709/222 |
| 6,362,745 B1 | 3/2002 | Davis ............................ 340/637 |
| 6,363,057 B1 | 3/2002 | Ardalan et al. ............... 370/252 |
| 6,366,217 B1 | 4/2002 | Cunningham et al. ... 340/870.31 |
| 6,369,719 B1 | 4/2002 | Tracy et al. .............. 340/870.02 |
| 6,369,769 B1 | 4/2002 | Nap et al. ..................... 343/719 |
| 6,373,399 B1 | 4/2002 | Johnson et al. .......... 340/870.11 |
| 6,396,839 B1 | 5/2002 | Ardalan et al. ............... 370/401 |
| 6,400,949 B1 | 6/2002 | Bielefeld et al. .............. 455/434 |
| 6,407,991 B1 | 6/2002 | Meier ........................... 370/338 |
| 6,415,330 B1 | 7/2002 | Okanoue ....................... 709/245 |
| 6,430,268 B1 | 8/2002 | Petite ............................. 379/39 |
| 6,437,692 B1 | 8/2002 | Petite et al. ................... 340/540 |
| 6,457,054 B1 | 9/2002 | Bakshi .......................... 709/227 |
| 6,480,497 B1 | 11/2002 | Flammer, III et al. ........ 370/400 |
| 6,480,505 B1 | 11/2002 | Johansson et al. ............ 370/449 |
| 6,492,910 B1 | 12/2002 | Ragle et al. .............. 340/870.02 |
| 6,509,841 B1 | 1/2003 | Colton et al. ............ 340/870.11 |
| 6,522,974 B2 | 2/2003 | Sitton ............................. 702/17 |
| 6,535,498 B1 | 3/2003 | Larsson et al. ................ 370/338 |
| 6,538,577 B1 | 3/2003 | Ehrke et al. .............. 340/870.02 |
| 6,553,355 B1 | 4/2003 | Arnoux et al. .................. 706/13 |
| 6,577,671 B1 | 6/2003 | Vimpari ........................ 375/146 |
| 6,606,708 B1 | 8/2003 | Devine et al. ..................... 726/8 |
| 6,618,578 B1 | 9/2003 | Petite ............................. 455/92 |
| 6,618,772 B1 | 9/2003 | Kao et al. ....................... 710/15 |
| 6,628,764 B1 | 9/2003 | Petite ....................... 379/106.01 |
| 6,633,823 B2 | 10/2003 | Bartone et al. .................. 702/57 |
| 6,636,894 B1 | 10/2003 | Short et al. ................... 709/225 |
| 6,650,249 B2 | 11/2003 | Meyer et al. ............. 340/870.28 |
| 6,653,945 B2 | 11/2003 | Johnson et al. .......... 340/870.02 |
| 6,657,552 B2 | 12/2003 | Belski et al. ............. 340/870.02 |
| 6,665,620 B1 | 12/2003 | Burns et al. ..................... 702/62 |
| 6,671,635 B1 | 12/2003 | Forth et al. ...................... 702/61 |
| 6,681,110 B1 | 1/2004 | Crookham et al. ............ 455/420 |
| 6,681,154 B2 | 1/2004 | Nierlich et al. ............... 700/286 |
| 6,684,245 B1 | 1/2004 | Shuey et al. .................. 709/223 |
| 6,691,173 B2 | 2/2004 | Morris et al. ................. 709/249 |
| 6,697,331 B1 | 2/2004 | Riihinen et al. .............. 370/236 |
| 6,710,721 B1 | 3/2004 | Holowick ................ 340/870.02 |
| 6,711,166 B1 | 3/2004 | Amir et al. ................. 370/395.1 |
| 6,711,409 B1 | 3/2004 | Zavgren, Jr. et al. ......... 455/445 |
| 6,714,787 B2 | 3/2004 | Reed et al. ................... 455/445 |
| 6,718,137 B1 | 4/2004 | Chin ................................ 398/3 |
| 6,725,281 B1 | 4/2004 | Zintel et al. ................... 719/318 |
| 6,728,514 B2 | 4/2004 | Bandeira et al. ............ 455/13.1 |
| 6,747,557 B1 | 6/2004 | Petite et al. ................... 340/540 |
| 6,747,981 B2 | 6/2004 | Ardalan et al. ............... 370/401 |
| 6,751,445 B2 | 6/2004 | Kasperkovitz et al. ......... 455/76 |
| 6,751,455 B1 | 6/2004 | Acampora ................. 455/414.1 |
| 6,751,672 B1 | 6/2004 | Khalil et al. .................. 709/230 |
| 6,772,052 B1 | 8/2004 | Amundsen et al. ........... 700/291 |
| 6,775,258 B1 | 8/2004 | van Valkenburg et al. .... 370/338 |
| 6,778,099 B1 | 8/2004 | Meyer et al. ............. 340/870.02 |
| 6,785,592 B1 | 8/2004 | Smith et al. .................. 700/291 |
| 6,798,352 B2 | 9/2004 | Holowick ................ 340/870.02 |
| 6,801,865 B2 | 10/2004 | Gilgenbach et al. ............ 702/61 |

| Patent No. | Date | Inventor | Class |
|---|---|---|---|
| 6,826,620 B1 | 11/2004 | Davis et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,231,482 B2 | 6/2007 | Leach | 710/305 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 * | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,586,420 B2 | 9/2009 | Fischer et al. | 340/635 |
| 7,599,665 B2 | 10/2009 | Sinivaara | 455/67.16 |
| 7,602,747 B2 | 10/2009 | Maksymczuk et al. | 370/331 |
| 7,609,673 B2 | 10/2009 | Bergenlid et al. | 370/329 |
| 7,613,147 B2 | 11/2009 | Bergenlid et al. | 370/329 |
| 7,623,043 B2 | 11/2009 | Mizra et al. | 340/870.02 |
| 7,626,967 B2 | 12/2009 | Yarvis et al. | 370/338 |
| 7,650,425 B2 | 1/2010 | Davis et al. | 709/238 |
| 7,676,231 B2 | 3/2010 | Demirhan et al. | 455/452.1 |
| 7,680,041 B2 | 3/2010 | Johansen | 370/230 |
| 7,729,496 B2 | 6/2010 | Hacigumus | 380/277 |
| 7,756,538 B2 | 7/2010 | Bonta et al. | 455/517 |
| 7,814,322 B2 | 10/2010 | Gurevich et al. | 713/171 |
| 7,847,706 B1 | 12/2010 | Ross et al. | 340/12.52 |
| 2001/0005368 A1 | 6/2001 | Rune | 370/390 |
| 2001/0038342 A1 | 11/2001 | Foote | 340/870.02 |
| 2001/0046879 A1 | 11/2001 | Schramm et al. | 455/525 |
| 2002/0012358 A1 | 1/2002 | Sato | 370/466 |
| 2002/0013679 A1 | 1/2002 | Petite | 702/188 |
| 2002/0031101 A1 | 3/2002 | Petite et al. | 370/310 |
| 2002/0066095 A1 | 5/2002 | Yu | 717/173 |
| 2002/0110118 A1 | 8/2002 | Foley | 370/352 |
| 2002/0120569 A1 | 8/2002 | Day | 705/40 |
| 2002/0174354 A1 | 11/2002 | Bel et al. | 713/193 |
| 2002/0186619 A1 | 12/2002 | Reeves et al. | 368/47 |
| 2003/0001640 A1 | 1/2003 | Lao et al. | 327/165 |
| 2003/0001754 A1 | 1/2003 | Johnson et al. | 340/870.02 |
| 2003/0033394 A1 | 2/2003 | Stine | 709/222 |
| 2003/0037268 A1 | 2/2003 | Kistler | 713/310 |
| 2003/0050737 A1 | 3/2003 | Osann | 700/276 |
| 2003/0112822 A1 | 6/2003 | Hong et al. | 370/469 |
| 2003/0117966 A1 | 6/2003 | Chen | 370/255 |
| 2003/0122686 A1 | 7/2003 | Ehrke et al. | 340/870.02 |
| 2003/0123481 A1 | 7/2003 | Neale et al. | 370/466 |
| 2003/0156715 A1 | 8/2003 | Reeds, III et al. | 380/37 |
| 2003/0229900 A1 | 12/2003 | Reisman | 725/87 |
| 2003/0233201 A1 | 12/2003 | Horst et al. | 702/62 |
| 2004/0008663 A1 | 1/2004 | Srikrishna et al. | 370/351 |
| 2004/0031030 A1 | 2/2004 | Kidder et al. | 717/172 |
| 2004/0034773 A1 | 2/2004 | Balabine et al. | 713/168 |
| 2004/0056775 A1 | 3/2004 | Crookham et al. | 340/825 |
| 2004/0066310 A1 | 4/2004 | Ehrke et al. | 340/870.02 |
| 2004/0077341 A1 | 4/2004 | Chandranmenon et al. | 455/418 |
| 2004/0082203 A1 | 4/2004 | Logvinov et al. | 439/10 |
| 2004/0100953 A1 | 5/2004 | Chen et al. | 370/389 |

| Pub. No. | Date | Inventor | Class |
|---|---|---|---|
| 2004/0113810 A1 | 6/2004 | Mason, Jr. et al. | 340/870.02 |
| 2004/0117788 A1 | 6/2004 | Karaoguz et al. | 717/177 |
| 2004/0125776 A1 | 7/2004 | Haugli et al. | 370/338 |
| 2004/0138787 A1 | 7/2004 | Ransom et al. | 700/295 |
| 2004/0140908 A1 | 7/2004 | Gladwin et al. | 340/870.02 |
| 2004/0157613 A1 | 8/2004 | Steer et al. | 455/446 |
| 2004/0183687 A1 | 9/2004 | Petite et al. | 340/601 |
| 2004/0185845 A1 | 9/2004 | Abhishek et al. | 455/422.1 |
| 2004/0210544 A1 | 10/2004 | Shuey et al. | 705/412 |
| 2005/0026569 A1 | 2/2005 | Lim et al. | 455/73 |
| 2005/0027859 A1 | 2/2005 | Alvisi et al. | 709/224 |
| 2005/0030968 A1 | 2/2005 | Rich et al. | 370/449 |
| 2005/0033967 A1 | 2/2005 | Morino et al. | 713/182 |
| 2005/0055432 A1 | 3/2005 | Rodgers | 709/223 |
| 2005/0058144 A1 | 3/2005 | Ayyagari et al. | 370/401 |
| 2005/0065742 A1 | 3/2005 | Rodgers | 702/62 |
| 2005/0122944 A1 | 6/2005 | Kwon et al. | 370/338 |
| 2005/0136972 A1 | 6/2005 | Smith et al. | 455/554.1 |
| 2005/0172024 A1 | 8/2005 | Cheifot et al. | 709/225 |
| 2005/0201397 A1 | 9/2005 | Petite | 370/401 |
| 2005/0243867 A1 | 11/2005 | Petite | 370/474 |
| 2005/0251403 A1 | 11/2005 | Shuey | 705/1 |
| 2005/0257215 A1 | 11/2005 | Denby et al. | 717/172 |
| 2005/0270173 A1 | 12/2005 | Boaz | 340/870.02 |
| 2005/0276243 A1 | 12/2005 | Sugaya et al. | 370/328 |
| 2005/0286440 A1 | 12/2005 | Strutt et al. | 370/253 |
| 2006/0028355 A1 | 2/2006 | Patterson et al. | 340/870.02 |
| 2006/0055432 A1 | 3/2006 | Shimokawa et al. | 327/5 |
| 2006/0056363 A1 | 3/2006 | Ratiu et al. | 370/338 |
| 2006/0056368 A1 | 3/2006 | Ratiu et al. | 370/338 |
| 2006/0077906 A1 | 4/2006 | Maegawa et al. | 370/254 |
| 2006/0087993 A1 | 4/2006 | Sengupta et al. | 370/310 |
| 2006/0098576 A1 | 5/2006 | Brownrigg et al. | 370/238 |
| 2006/0098604 A1 | 5/2006 | Flammer et al. | 370/337 |
| 2006/0111111 A1 | 5/2006 | Ovadia | 455/439 |
| 2006/0140135 A1 | 6/2006 | Bonta et al. | 370/254 |
| 2006/0146717 A1 | 7/2006 | Conner et al. | 370/238 |
| 2006/0158347 A1 | 7/2006 | Roche et al. | 340/870.02 |
| 2006/0161310 A1 | 7/2006 | Lal | 700/1 |
| 2006/0167784 A1 | 7/2006 | Hoffberg | 705/37 |
| 2006/0184288 A1 | 8/2006 | Rodgers | 700/295 |
| 2006/0215583 A1 | 9/2006 | Castagnoli | 370/254 |
| 2006/0215673 A1 | 9/2006 | Olvera-Hernandez | 370/406 |
| 2006/0217936 A1 | 9/2006 | Mason et al. | 702/188 |
| 2006/0230276 A1 | 10/2006 | Nochta | 713/176 |
| 2006/0271244 A1 | 11/2006 | Cumming et al. | 700/291 |
| 2006/0271678 A1 | 11/2006 | Jessup et al. | 709/224 |
| 2007/0001868 A1 | 1/2007 | Boaz | 340/870.02 |
| 2007/0013547 A1 | 1/2007 | Boaz | 340/870.02 |
| 2007/0019598 A1 | 1/2007 | Prehofer | 370/338 |
| 2007/0036353 A1 | 2/2007 | Reznik et al. | 380/30 |
| 2007/0057767 A1 | 3/2007 | Sun et al. | 340/7.35 |
| 2007/0060147 A1 | 3/2007 | Shin et al. | 455/445 |
| 2007/0063868 A1 | 3/2007 | Borleske | 340/870.03 |
| 2007/0085700 A1 | 4/2007 | Walters et al. | 340/870.02 |
| 2007/0087756 A1 | 4/2007 | Hoffberg | 455/450 |
| 2007/0103324 A1 | 5/2007 | Kosuge et al. | 340/618 |
| 2007/0109121 A1 | 5/2007 | Cohen | 340/539.26 |
| 2007/0110024 A1 | 5/2007 | Meier | 370/351 |
| 2007/0120705 A1 | 5/2007 | Kiiskila et al. | 340/870.02 |
| 2007/0136817 A1 | 6/2007 | Nguyen | 726/26 |
| 2007/0139220 A1 | 6/2007 | Mirza et al. | 340/870.02 |
| 2007/0143046 A1 | 6/2007 | Budike, Jr. | 702/62 |
| 2007/0147268 A1 | 6/2007 | Kelley et al. | 370/254 |
| 2007/0169074 A1 | 7/2007 | Koo et al. | 717/168 |
| 2007/0169075 A1 | 7/2007 | Lill et al. | 717/168 |
| 2007/0169080 A1 | 7/2007 | Friedman | 717/168 |
| 2007/0177538 A1 | 8/2007 | Christensen et al. | 370/328 |
| 2007/0177576 A1 | 8/2007 | Johansen et al. | 370/351 |
| 2007/0177613 A1 | 8/2007 | Shorty et al. | 370/401 |
| 2007/0189249 A1 | 8/2007 | Gurevich et al. | 370/338 |
| 2007/0200729 A1 | 8/2007 | Borleske et al. | 340/870.03 |
| 2007/0201504 A1 | 8/2007 | Christensen et al. | 370/437 |
| 2007/0204009 A1 | 8/2007 | Shorty et al. | 709/218 |
| 2007/0205915 A1 | 9/2007 | Shuey et al. | 340/870.02 |
| 2007/0206503 A1 | 9/2007 | Gong et al. | 370/238 |
| 2007/0206521 A1 | 9/2007 | Osaje | 370/315 |
| 2007/0207811 A1 | 9/2007 | Das et al. | 455/450 |
| 2007/0210933 A1 | 9/2007 | Leach | 340/870.02 |
| 2007/0211636 A1 | 9/2007 | Bellur et al. | 370/238 |
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0086560 A1 | 4/2008 | Monier et al. | 709/224 |
| 2008/0089314 A1 | 4/2008 | Meyer et al. | 370/349 |
| 2008/0095221 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/412 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/224 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |

| | | | | |
|---|---|---|---|---|
| 2009/0102737 A1 | 4/2009 | Birnbaum et al. | | 343/828 |
| 2009/0115626 A1 | 5/2009 | Vaswani et al. | | 340/870.02 |
| 2009/0134969 A1 | 5/2009 | Veillette | | 340/3.1 |
| 2009/0135716 A1 | 5/2009 | Veillette | | 370/221 |
| 2009/0135843 A1 | 5/2009 | Veillette | | 370/406 |
| 2009/0161594 A1 | 6/2009 | Zhu et al. | | 370/312 |
| 2009/0167547 A1 | 7/2009 | Gilbert | | 340/662 |
| 2009/0168846 A1 | 7/2009 | Filippo, III et al. | | 375/133 |
| 2009/0175238 A1 | 7/2009 | Jetcheva et al. | | 370/329 |
| 2009/0179771 A1 | 7/2009 | Seal et al. | | 340/870.04 |
| 2009/0235246 A1 | 9/2009 | Seal et al. | | 717/173 |
| 2009/0243840 A1 | 10/2009 | Petite et al. | | 340/539.1 |
| 2009/0245270 A1 | 10/2009 | van Greunen et al. | | 370/410 |
| 2009/0262642 A1 | 10/2009 | van Greunen et al. | | 370/216 |
| 2009/0267792 A1 | 10/2009 | Crichlow | | 340/870.02 |
| 2009/0285124 A1 | 11/2009 | Aguirre et al. | | 370/255 |
| 2009/0303972 A1 | 12/2009 | Flammer, III et al. | | 370/338 |
| 2009/0315699 A1 | 12/2009 | Satish et al. | | 340/533 |
| 2009/0319672 A1 | 12/2009 | Reisman | | 709/227 |
| 2009/0320073 A1 | 12/2009 | Reisman | | 725/51 |
| 2010/0037069 A1 | 2/2010 | Deierling et al. | | 713/193 |
| 2010/0037293 A1 | 2/2010 | St. Johns et al. | | 726/2 |
| 2010/0040042 A1 | 2/2010 | van Greunen et al. | | 370/350 |
| 2010/0060259 A1 | 3/2010 | Vaswani et al. | | 324/86 |
| 2010/0061350 A1 | 3/2010 | Flammer, III | | 370/338 |
| 2010/0073193 A1 | 3/2010 | Flammer, III | | 340/870.11 |
| 2010/0074176 A1 | 3/2010 | Flammer, III et al. | | 370/328 |
| 2010/0074304 A1 | 3/2010 | Flammer, III | | 375/134 |

FOREIGN PATENT DOCUMENTS

| | | |
|---|---|---|
| EP | 0 663 746 B1 | 1/2003 |
| EP | 0 812 502 B1 | 8/2004 |
| EP | 0 740 873 B1 | 12/2005 |
| JP | 10-070774 | 3/1998 |
| JP | 10-135965 | 5/1998 |
| WO | WO 95/12942 | 5/1995 |
| WO | WO 96/10307 | 4/1996 |
| WO | WO 96/10307 A1 | 4/1996 |
| WO | WO 00/54237 | 9/2000 |
| WO | WO 01/26334 A2 | 4/2001 |
| WO | WO 01/55865 A1 | 8/2001 |
| WO | WO 03/015452 | 2/2003 |
| WO | WO 2005/091303 | 9/2005 |
| WO | WO 2006/059195 | 6/2006 |
| WO | WO 2007/015822 | 8/2007 |
| WO | WO 2007/132473 | 11/2007 |
| WO | WO 2008/027457 | 3/2008 |
| WO | WO 2008/033287 A2 | 3/2008 |
| WO | WO 2008/033514 A2 | 3/2008 |
| WO | WO 2008/038072 | 4/2008 |
| WO | WO 2008/092268 A1 | 8/2008 |

OTHER PUBLICATIONS

Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf-manet-dsr-00.txt.

Katz, Randy H. and Brewer, Eric A., "The Case for Wireless Overlay Networks," *Electrical Engineering and Computer Science Department, University of California, Berkeley*, 12 pp., 1996.

Johnson, David B., "Routing in Ad Hoc Networks of Mobile Hosts," *IEEE*, pp. 158-163, 1995.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

International Search Report and Written Opinion for Application No. PCT/US08/13021, dated Jan. 15, 2009, 11 pp.

International Search Report and Written Opinion for Application No. PCT/US08/13016, dated Jan. 9, 2009, 7 pp.

International Search Report and Written Opinion for Application No. PCT/US08/13024, dated Jan. 13, 2009, 9 pp.

International Search Report and Written Opinion for Application No. PCT/US08/13022, dated Jan. 27, 2009, 10 pp.

International Search Report and Written Opinion for Application No. PCT/US08/13030, dated Jan. 9, 2009, 7 pp.

International Search Report and Written Opinion for Application No. PCT/US08/12161, dated Mar. 2, 2009, 13 pp.

International Search Report and Written Opinion for Application No. PCT/US08/13017, dated Mar. 18, 2009, 11 pp.

International Search Report and Written Opinion for Application No. PCT/US08/13032, dated May 12, 2009, 14 pp.

International Search Report and Written Opinion for Application No. PCT/US08/13026, dated Feb. 24, 2009, 9 pp.

International Search Report and Written Opinion for Application No. PCT/US08/13029, dated Feb. 2, 2009, 8 pp.

Reexamination Application No. 90/008,011, filed Jul. 24, 2006, 75 pp.

Hydro One Networks, Inc., Request for Proposal for Smart Metering Services, 16 pp., Mar. 4, 2005.

Trilliant Networks, "The Trilliant AMI Solution," RFP SCP-07003, 50 pp., Mar. 22, 2007.

"ZigBee Smart Energy Profile Specification," ZigBee Profile 0x0109, Revision 14, Document 075356r14, 202 pp., May 29, 2008.

Hubaux, J. P., et al. "Towards Mobile Ad-Hoc WANs: Terminodes," 2000 IEEE, Wireless Communications and Networking Conference, WCNC, vol. 3, pp. 1052-1059, 2000.

Miklos, G., et al., "Performance Aspects of Bluetooth Scatternet Formation," First Annual Workshop on Mobile and Ad Hoc Networking and Computing, MobiHOC 2000, pp. 147-148, 2000.

Eng, K. Y., et al. "Bahama: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.

Lee, David J. Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Privat, G., "A System-Architecture Viewpoint on Smart Networked Devices," Microelectronic Engineering, vol. 54, Nos. 1-2, pp. 193-197, Dec. 2000.

Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.

Kapoor, R., et al., "Multimedia Support Over Bluetooth Piconets," First Workshop on Wireless Mobile Internet, pp. 50-55, Jul. 2001.

Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.

"AMRON Meter Management System" [online], [retrieved on May 12, 2005], 41 pp., Retrieved from the Internet: http://www.amronm5.com/products/.

International Search Report and Written Opinion for Application No. PCT/US09/05008, dated Oct. 22, 2009, 8 pp.

Nachum Shacham, Edwin B. Brownrigg, & Clifford A. Lynch, *A Packet Radio Network for Library Automation*, 1987 IEEE Military Communications Conference, vol. 2 at 21.3.1, (Oct. 1987). (TN-IP 0004176-82).

Nachum Shacham & Janet D. Tornow, Future Directions in Packet Radio Technology, Proc. of the IEEE Infocom 1985 at 93 (Mar. 1985). (TN-IP 0005080-86), 17 pp.

John Jubin & Janet D. Tornow, The DARPA Packet Radio Network Protocols, Proc. of the IEEE, vol. 75, No. 1 at 21 (Jan. 87). (TN-IP 0004930-41).

John Jubin, Current Packet Radio Network Protocols, Proc. of IEEE Infocom 1985 at 86 (Mar. 1985), (TN-IP 0004921-29), 9 pp.

David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), (TN-IP 0006929-46), 18 pp.

David B. Johnson, Mobile Host Internetworking Using IP Loose Source Routing, Carnegie Mellon University CMU-CS-93-128, DARPA Order No. 7330 (Feb. 1993), (TN-IP 0006911-28), 18 pp.

Daniel M. Frank, Transmission of IP Datagrams Over NET/ROM Networks, Proc. of the ARRL 7th Computer Networking Conference 1988 at 65 (Oct. 1988), (TN-IP 0006591-96), 6 pp.

Robert E. Kahn, et al., Advances in Packet Radio Technology, Proc. of the IEEE, vol. 66, No. 11, pp. 1468-1496 (Nov. 1978), (TN-IP 0004942-71).

Clifford A. Lynch & Edwin B. Brownrigg, Packet Radio Networks, Bergamon Press, 259-74 (1987), (TN-IP 0004018-175).

Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), (TN-IP 0005018-28), 11 pp.

William MacGregor, Jil Westcott, & Michael Beeler, Multiple Control Stations in Packet Radio Networks, 1982 IEEE Military Communications Conference, vol. 3 at 10.3-1 (Oct. 1982), (TN-IP 0004988-93), 6 pp.

Nachum Shacham & Jil Westcott, Future Directions in Packet Radio Architectures and Protocols, Proc. of the IEEE, vol. 75, No. 1 at 83 (Jan. 1987), (TN-IP 0008712-28), 17 pp.

David B. Johnson and David A. Maltz, Protocols for Adaptive Wireless and Mobile Networking, IEEE Personal Communications, Feb. 1996, p. 34-42.

Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.

David A. Beyer, Accomplishments of the DARPA SURAN Program, IEEE MILCOM 1990, p. 39.6.1-8.

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713- 27, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

J.R. Cleveland, Performance and Design Considerations for Mobile Mesh Networks, IEEE MILCOM 96, vol. 1, p. 245-49.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.

J. Jonquin Garcia-Luna-Aceves, A Fail-Safe Routing Algorithm for Multihop Packet-Radio Networks, IEEE Infocom '86, p. 434-43, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks*, IEEE Transactions on Circuits and Systems, vol. Cas-23, No. 12, p. 806-13 ,Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the 16$^{th}$ ICDCS, p. 319-326, 1996.

Daniel Cohen, Jonathan B. Postel, and Raphael Rom, *Addressing and Routing in a Local Wireless Network*, IEEE Infocom 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009).

Jonathan J. Hahn and David M. Stolle, *Packet Radio Network Routing Algorithms: A Survey*, IEEE Communications Magazine, vol. 22, No. 11, p. 41-7, Nov. 1984.

David A. Hall, *Tactical Internet System Architecture for the Task Force XXI*, IEEE 1996, p. 219-30.

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-drafts/draft-ietf-mobileip-optim-00.txt (last visited September 26, 2009), 32 pp.

Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *Mobile Networking System Based on Internet Protocol*, IEEE Personal Communications, First Quarter 1994, IEEE 1994, p. 32-41.

Richard Schulman, Richard Snyder, and Larry J. Williams, *SINCGARS Internet Controller-Heart of the Digitized Battlefield*, Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382.

D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.

Jens Zander and Robert Forchheimer, *The SOFTNET Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE Milcom 1984, Oct. 21-24, 1984, Conference Record vol. 2, p. 214-8.

Leis, John, "TCP/IP Protocol Family," pp. 1 and 42-43, Apr. 3, 2006.

Supplementary European Search Report for Application No. EP 08 85 1869, dated Dec. 30, 2010, 7 pp.

International Search Report for Application No. PCT/US10/26956, dated May 19, 2010, 2 pp.

Supplementary European Search Report for Application No. EP 08 85 1132, dated Dec. 6, 2010, 9 pp.

Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).

Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).

Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, CH, No. 1, Jul. 7, 2007 (XP015050851) (ISSN: 000-0004).

Perkins, C. E., et al., "Ad Hoc On-Demand Distance Vector (AODV) Routing," Network Working Group Internet Draft, XX, Nov. 9, 2001 (XP002950167).

Postel, J., "RFC 793 Transmission Control Protocol," Sep. 1981 [retrieved on Jan. 1, 2007], Retrieved From the Internet: http://www.ietforg/rfc/rfc0793.txt.

Supplementary European Search Report for Application No. EP 08 85 1927, dated Dec. 22, 2010, 10 pp.

Younis, M., et al., "Energy-Aware Routing in Cluster-Based Sensor Networks," Modeling, Analysis and Simulation of Computer and Telecommunications Systems, 10th IEEE Proceedings on Mascots, Oct. 11-16, 2002, Piscataway, NJ (XP010624424) (ISNB: 978-0-7695-1840-4).

Supplementary European Search Report for Application No. EP 08 85 3052, dated Mar. 18, 2011, 10 pp.

Supplementary European Search Report for Application No. EP 08 85 1560, dated Mar. 24, 2011, 9 pp.

Supplementary European Search Report for Application No. EP 08 85 2992, dated Mar. 23, 2011, 6 pp.

* cited by examiner

METHODS AND SYSTEMS FOR VIRTUAL ENERGY MANAGEMENT DISPLAY

FIELD OF THE INVENTION

The present invention relates to premises energy management, and in particular to systems and methods for virtual energy management display utilizing an intelligent radio communication memory storage device that creates a virtual energy display and smart thermostat using a digital photo display and other picture display devices.

BACKGROUND OF THE INVENTION

Many energy markets around the world are currently moving away from fixed energy pricing and towards dynamic or tiered pricing. A major element of these markets includes smart meter networks commonly referred to as Advanced Metering Infrastructure (AMI) that measure, collect and analyze energy usage, from advanced devices such as smart electric, gas and water meters, through various communication networks to meter data management software systems where the data are made available for various business systems. For example, AMI systems monitor energy usage and report period usage for the purpose of allocating time-based prices.

In some cases, these markets are also presently advocating implementation of remote control of consumer appliance assets with systems that respond to prices or reliability-driven reduction by reducing the aggregate energy demand during peak demand periods for the purpose of mitigating extreme price volatility, black-out and regional emissions problems due to the inefficient use of power.

So-called smart thermostats and other direct load control devices are connected to these AMI network systems. Smart thermostats are programmable and allow, for example, the creation of adjustment schedules based on the occupants' routine and communication-enabled smart thermostats can have a feature of being able to react to other systems in the premises, such as the status of the security system (whether it's armed or disarmed) which can trigger the thermostat to adjust. In some markets, consumer advocates and regional planners are additionally working on ways to effectively notify consumers of impending price swings or soliciting behavioral changes by requesting reductions in advance of, or about the same time as, a system peak load event.

There is a present need for specially purposed energy display devices that can operate as information and messaging portals allowing price notifications, critical peak pricing notices, and other information needed to help consumers. There is also a present need for such specially purposed energy display devices that would allow, for example, meter usage to be conveniently displayed in the home as opposed to display only on the remote and somewhat cryptic dial of the meter itself which most consumers are likely to be unable to read or interpret.

Such specially purposed energy display devices should provide, for example, energy efficiency information about appliances or home comfort level information without a need for unique, redundant and dedicated energy display devices and allow consumers to effectively participate in a dynamic pricing or tiered energy market.

Such information could include, for example, critical peak energy warnings notifying customers of anticipated peak energy periods during which prices will increase temporarily during variable periods, current and historical meter readings from the meters, and utility account balance (payment and/or prepaid information) and other account information from the local utility.

SUMMARY OF THE INVENTION

Embodiments of the invention utilize, for example, computer hardware, operating systems, programming languages, software applications, and other technology to provide methods and systems for virtual energy management display that involves, for example, periodically receiving electronic data representing energy management-related information via a mesh local area network by a radio frequency (RF) communication-enabled memory storage device coupled to an electronic display device within a home area network. Embodiments of the invention further comprise, for example, periodically receiving electronic data representing telemetry information by the RF communication-enabled memory storage device from one or more RF communication-enabled energy management-related devices within the home area network. The received electronic data are converted to a common format displayable on a screen associated with the display device by an application running at least in part on the memory storage device, and the converted energy management-related information and telemetry information are displayed on the screen associated with the display device by the application.

In embodiments of the invention, the electronic data representing energy management-related information further comprises electronic data representing real time energy management-related messages regarding, for example, energy pricing information, energy usage information, energy account information, energy-related weather information, and/or energy-related security information.

The RF communication-enabled memory storage device for embodiments of the invention further comprises, for example, a RF communication-enabled integrated circuit (IC) data storage card, such as a secure digital card (SD card), a micro-SD card, a CompactFlash card (CF card), a Universal Serial Bus (USB) storage device, and/or a network memory stick. Further, in embodiments of the invention, the electronic display device further comprises, for example, a digital photo device, a screensaver application on a computing device, or the RF communication-enabled memory storage device integrated with the electronic display device, such as a smartphone, a wireless computing device with a screen saver application, a RF communication-enabled PDA liquid crystal display (LCD) television, and/or a RF communication-enabled PDA docking station.

According to embodiments of the invention, the electronic data representing telemetry information further comprises electronic data representing localized telemetry information, local weather delivered from sensors, and/or energy management telemetry data from local loads such as meters. In addition, the RF communication-enabled energy management-related device in embodiments of the invention further comprises, for example, an energy management load management control device coupled to an Advanced Metering Infrastructure (AMI) network system, such as a smart meter and/or a smart thermostat, either or both of which can have a card slot for receiving an RF communication-enabled integrated circuit (IC) data storage card. The RF communication-enabled energy management-related device in embodiments of the invention can also comprise, for example, an energy meter, a thermostat, a solar panel system control, wind generator system control, a pool pump control, and/or a water heater control.

Converting the received electronic data to a format displayable on the screen associated with the display device for embodiments of the invention further comprises, for example, converting the received electronic data into a display of scrolling text and graphics in a format, such as GIF or PDF format. Additionally, in embodiments of the invention, displaying the converted energy management-related information and telemetry information further comprises, for example, alternating between the display of the converted energy management-related information and telemetry information and pre-selected graphics or photographs.

In further embodiments of the invention, displaying the converted energy management-related information further comprises, for example, displaying the converted energy management-related information in the form of a ticker, and displaying the converted telemetry information further comprises, for example, displaying the converted telemetry information in the form of a virtual thermostat and/or a virtual energy meter.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 3A illustrates a display 380 displaying an exemplary virtual thermostat 381 and FIG. 3B illustrates a display displaying an exemplary virtual energy meter 382.

DETAILED DESCRIPTION

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Referring now in detail to embodiments of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention covers such modifications and variations that come within the scope of the invention.

Embodiments of the present invention provide methods and systems for virtual energy management display that afford a universally applicable and affordable approach to the need for specially purposed energy display devices in which one or more simple, familiar devices are converted and/or adapted from one purpose to another by employing messaging and peer-to-peer device communication functionality. Thus, embodiments of the invention involve converting network messages into forms which can be displayed among scrolling pictures.

According to embodiments of the invention, for example, a simple digital photo device or screen-saver on a PC can be converted into a scrolling information display which alternates basic information, such as weather, time and local forecast with valuable energy efficiency information, such as usage during the current month, savings thus far in the current year, local smog conditions, personal carbon footprint, carbon reduction, and the like.

The approach for embodiments of the invention actually improves the esthetics of a home with pre-selected or personal pictures and replaces a few alternating photos with customizable displays of messages and simulations of other familiar devices such as thermostats or weather stations.

As previously noted, embodiments of the invention involve computer hardware and software applications and other technology. Hardware according to embodiments of the invention includes, for example, dual purpose networked devices for delivering messages, providing a virtual energy management portal, providing a meter display and/or providing a remote smart thermostat interface using any of one or more common consumer computing device products.

Such dual purpose networked devices for embodiments of the invention include, for example, radio frequency (RF) communication-enabled memory devices that communicate directly with a network, such as RF communication-enabled smart meters that can communicate over wireless mesh networks. By enabling real-time messaging with additional recommendations, embodiments of the invention provide critical peak price warnings which can effectively protect consumers from unnecessary cost inflation while helping to reduce aggregate demand and emissions.

A significant deficiency of many prior art approaches to providing energy display devices is that such displays are generally unfamiliar, cluttered, cumbersome and cryptic. Moreover, such devices typically meet with a certain level of resistance to introduction of yet another special appliance. Thus, in markets in which regulators, politicians and environmentalists are trying to encourage energy awareness and control price volatility and emissions content by soliciting consumer behavior patterns, they have little success in interesting consumers in new devices that are unfamiliar and costly. To overcome such deficiencies, embodiments of the invention employ general purpose and familiar devices that have the advantage of operating as dual purpose portals for consumers.

As used herein from time-to-time, the term "network" refers to a mesh local area network (LAN) connection from embodiments of the invention to a neighborhood area network (NAN), grid area network (GAN) or home area network (HAN) that comprises, for example, energy meters, thermostats, solar panel systems, wind generator systems, other clean tech resources and other home control devices such as pool pumps, water heater controls and the like.

As also used herein from time-to-time, the term "card" refers to any one or more memory/storage devices, including without limitation, a secure digital card (SD Card), a micro-SD card, a CompactFlash (CF) card, a Universal Serial Bus (USB) storage device or integrated component supporting the network within consumer devices, such as smartphones; personal computers (PCs), laptops, or personal digital assistants (PDAs) screen savers; liquid crystal display (LCD) televisions; or the like.

SD cards are integrated circuit (IC) cards designed to store data and to enable the transfer of data between devices equipped with SD card slots, and micro-SD is a format for removable flash memory cards. CompactFlash is a mass storage device format used in portable electronic devices, and CF cards are designed to store data and to enable the transfer of data between devices equipped with CF slots. Likewise, memory stick is a removable flash memory card format, and a memory stick is an IC storage device designed to store data and enable the transfer of data between devices equipped with memory stick slots.

Embodiments of the invention propose hardware aspects, such as a network memory stick, for example, in SD and/or USB storage device form or similar component reduced to integrated form that comprises the same functionality. Examples include product applications, such as dedicated displays, e.g., simple photo sticks used in scrolling digital photo displays, smartphones, PCs or PDA screen savers, or LCD televisions with SD and USB memory stick options.

Other embodiments of the invention propose hardware aspects, such as a combination PDA docking station with an integrated communications device that allows the device to receive messages via a network. Still other embodiments of the invention propose hardware aspects, such as a thermostat provided with an SD or similar slot that can operate as a messaging device. Further embodiments of the invention propose hardware aspects, such as a universal remote control with a card slot or with integrated network and energy management functions.

Figure 1:
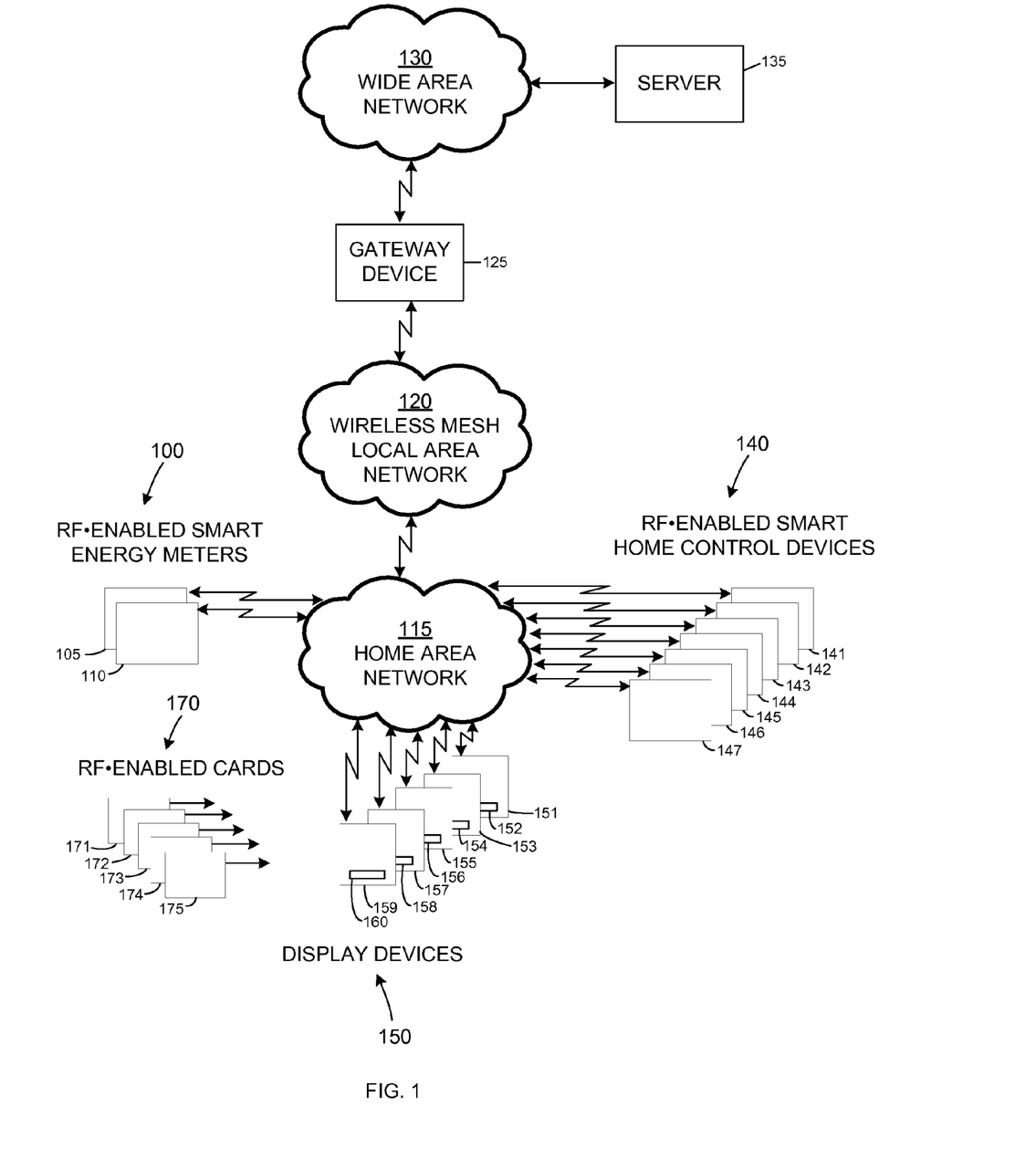
FIG. 1 is a schematic diagram that illustrates an overview example of key components and the flow of information between key components of the virtual energy management display method and system for embodiments of the invention.

FIG. 1 is a schematic diagram that illustrates an overview example of key components and the flow of information between key components of the virtual energy management display system for embodiments of the invention. Referring to FIG. 1, embodiments of the invention employ, for example, a plurality of RF-enabled smart energy meters 100, such as gas 105 and/or electric 110 meters in a home area network (HAN) 115 coupled over a wireless mesh local area network (LAN) 120 to a gateway device 125, which is in turn coupled over a wide area network (WAN) 130 to one or more servers 135, such as web servers, head end servers, back end servers, communication servers, or the like. The particular types of smart energy meters identified is not exhaustive, and embodiments of the invention include any and all types of smart meters.

Referring further to FIG. 1, likewise in the HAN 115 coupled over the wireless mesh LAN 120 to the gateway device 125 are a plurality of RF-enabled home control devices 140, such as universal remote controls 141 with card slots acting as messaging devices, pool pump controls 142, thermostats 143 with card slots acting as messaging devices, appliance controls 144, water heater controls 145, solar panel system controls 146, and wind generator system controls 147. Likewise, the itemization of home control devices is not exhaustive, and embodiments of the invention include home control devices of any and all types.

According to embodiments of the invention, additionally in the HAN 115 coupled over the wireless mesh LAN 120 to the gateway device 125 are display devices 150, such as a digital photo device 151 with an integrated communication device such as photo stick slot 152, a smart phone 153 with a card slot 154, a screen saver of a PC or PDA 155 with a card slot 156, a LCD television 157 with a card slot 158, and/or a PDA docking station 159 with integrated communication device or card slot 160. The respective card slots are adapted for one or more RF communication-enabled cards 170, such as an SD card 171, a micro-SD card 172, a CF card 173, a USB card 174, and/or a photo stick 175. Again, the itemization of display devices and/or RF communication-enabled cards is not exhaustive, and embodiments of the invention include any and all types of electronic display devices and RF communication-enabled cards.

Software aspects proposed by embodiments of the invention include, for example, network application functionality and card functions which convert messages to static, alternating, event-driven or scrolling screen forms that alternate common information displays with consumer and energy information delivered via the network. According to such aspect, messages are delivered to hardware aspect devices of embodiments of the invention via the network and converted to common formats, displayable through or on the above devices.

These screen display graphic forms for embodiments of the invention combine consumer customizable information, local device status and notices that relate to significantly improved levels of comfort, energy and environmental stewardship. Such information can include, for example, pricing information such as rate tier prices, critical peak prices, variable prices; personal energy management information such as account balance, usage comparison; personal environmental stewardship information carbon footprint calculations.

Other examples of such information for embodiments of the invention include localized telemetry information such as local weather delivered from sensors connected to the network or via a network gateway device that integrates other networks, relevant energy management telemetry data from local loads such as meters; weather forecasts and energy news; warnings, such as critical peak events and/or smog days; helpful tip messages for conserving power; and city, state, community or homeland security information.

On a digital display for embodiments of the invention, the forms are periodically updated with the message information and display in the common format, such as GIF or PDF. The forms include the use of familiar virtual display devices, such as a virtual thermostat, a ticker tape, or energy meter.

Figure 2:
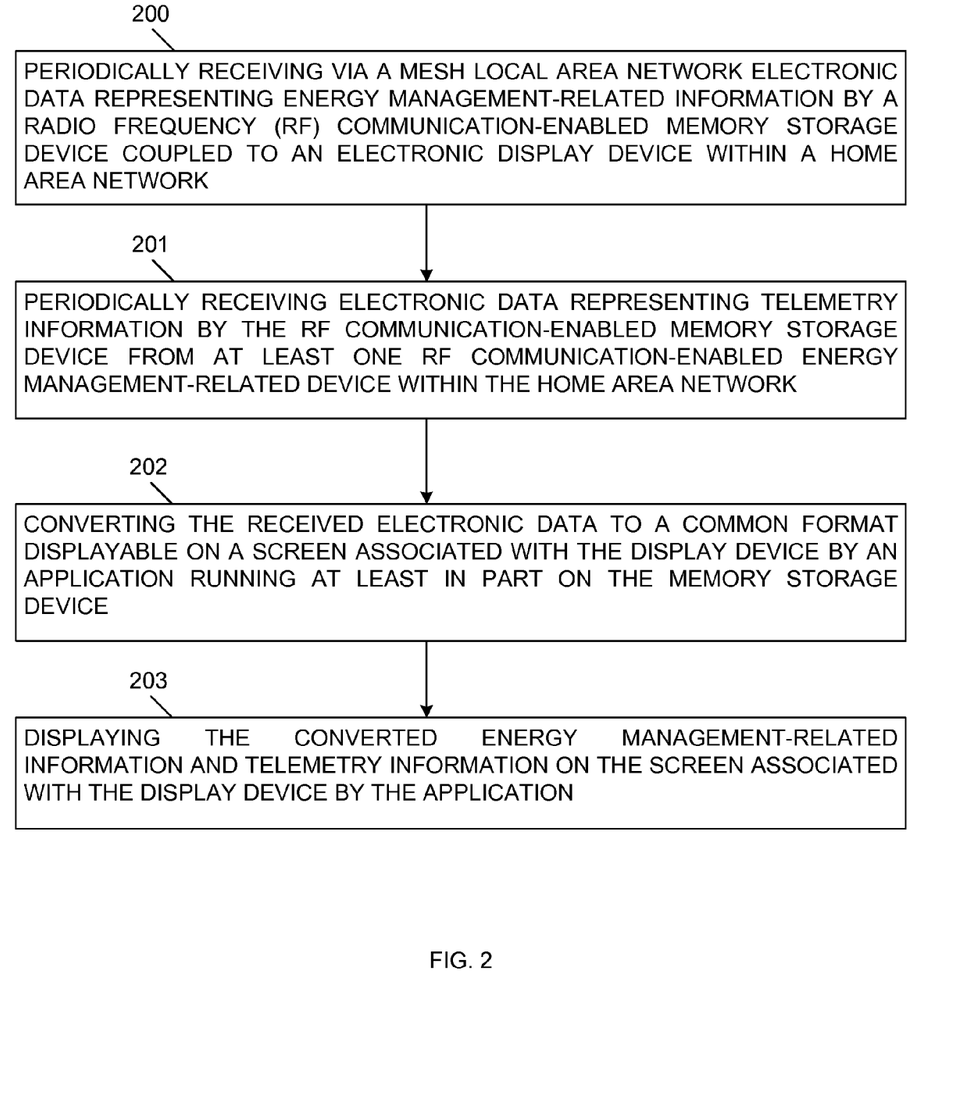
FIG. 2 is a schematic flow chart that illustrates an example of the process of virtual energy management display for embodiments of the invention.

FIG. 2 is a schematic flow chart that illustrates an example of the process of virtual energy management display for embodiments of the invention. Referring to FIG. 2, at 200, electronic data representing energy management-related information is periodically received via the mesh local area network 120 by a radio frequency (RF) communication-enabled memory storage device 170 coupled to an electronic display device 150 within the home area network 115. At 201, electronic data representing telemetry information is likewise periodically received by the RF communication-enabled memory storage device 170 from at least one RF communication-enabled energy management-related device 100 or 140 within the home area network 115.

Referring further to FIG. 2, at 202, the received electronic data is converted to a common format displayable on a screen associated with a display device 150 by an application running at least in part on the memory storage device 170, and at 203, the converted energy management-related information and telemetry information are displayed on the screen associated with the display device 150 by the application.

Figure 3A:
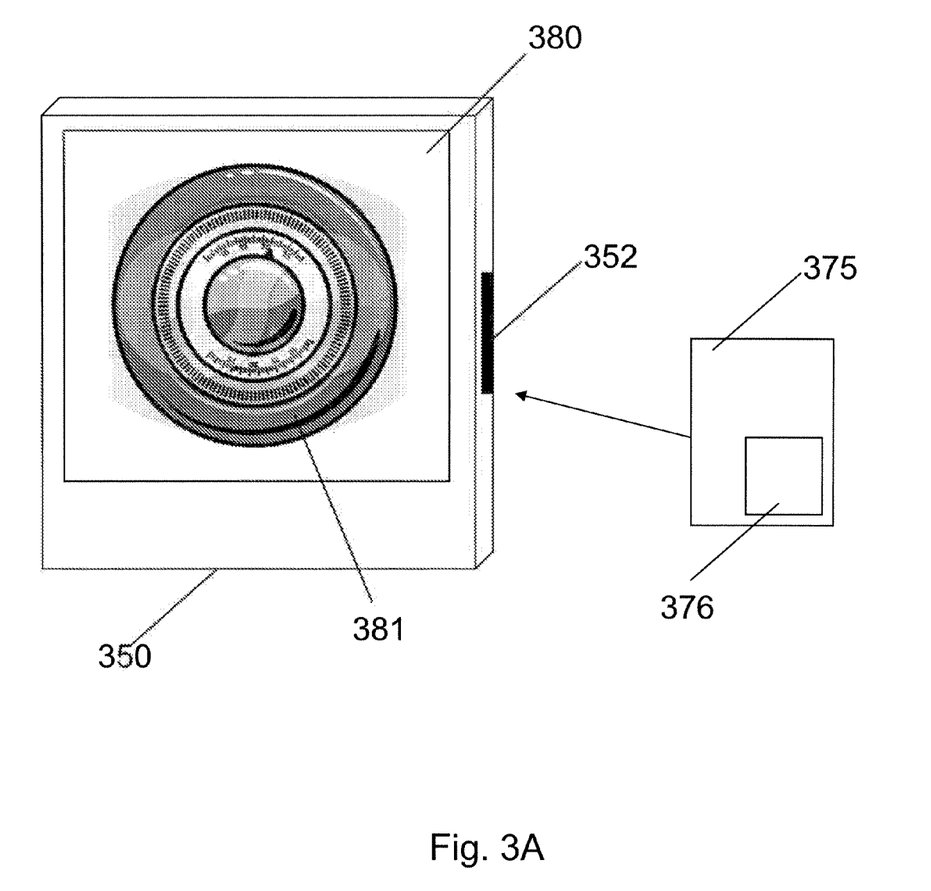
FIGS. 3A and 3B are schematic diagrams of exemplary virtual energy management display systems.
Figure 3B:
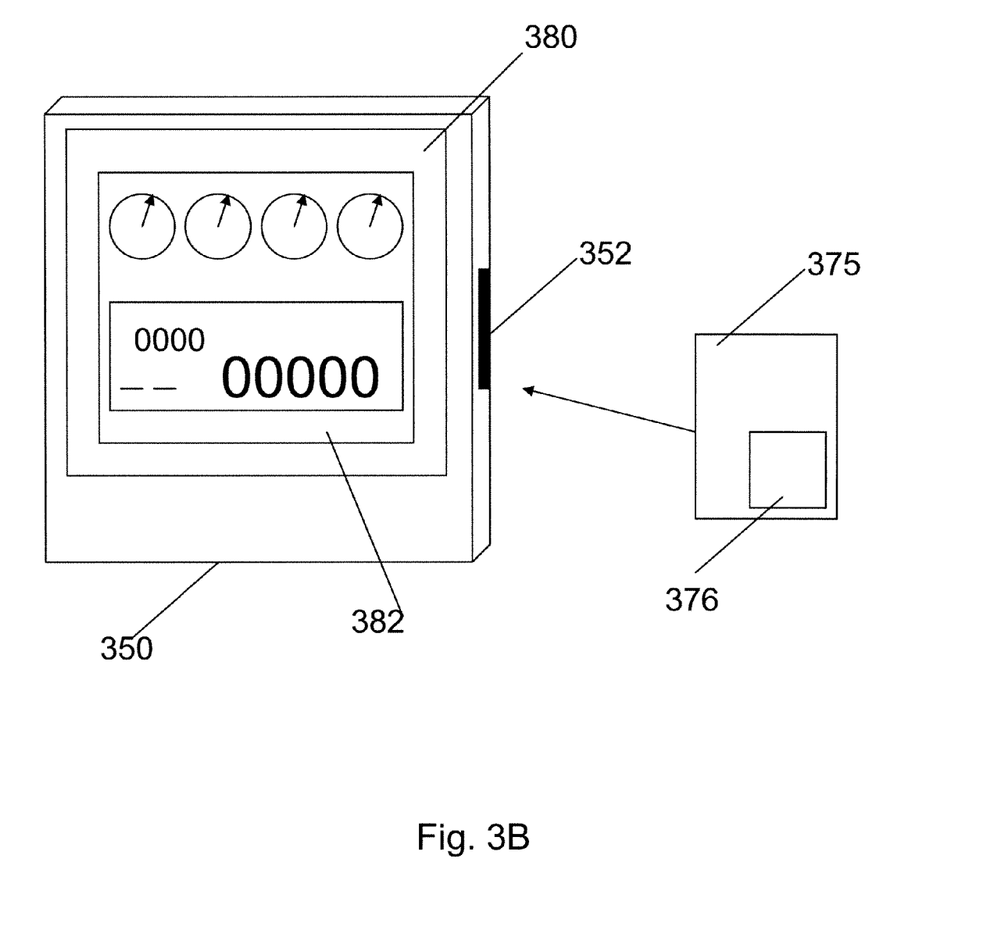

Referring to FIGS. 3a and 3B, schematic diagrams of exemplary virtual energy management display systems are illustrated. As shown, display device 350 includes a display 380 and integrated communication device slot 352. An RF-enabled card (i.e. memory storage device) 375 is shown, having an application 376 running at least in part on the memory storage device for converting received electronic data to a common format displayable on a screen 380 associated with the display device 350 and for displaying the converted energy management-related information and telemetry information on the screen associated with the displaying an exemplary virtual thermostat 381 in FIG. 3A and as displaying an exemplary virtual energy meter 382 in FIG. 3B.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A method of virtual energy management display, comprising:
periodically receiving, from an RF communication-enabled energy load management control device coupled to a smart meter network and a home area network, electronic data representing energy management-related information, by a radio frequency (RF) communication-enabled integrated circuit (IC) data storage card coupled to an electronic display device, the data storage card coupled to the home area network;
periodically receiving electronic data representing telemetry information by the RF communication-enabled data storage card from the RF communication-enabled energy load management control device coupled to the home area network, wherein the telemetry information comprises;
converting the received electronic data to a common format displayable on a screen associated with the display device by an application running at least in part on the data storage card; and
displaying the converted energy management-related information and telemetry information on the screen associated with the display device by the application wherein the RF communication enabled energy load management control device comprises at least one of a smart meter and a smart thermostat, wherein the at least one of the smart meter and smart thermostat further comprises a card slot for receiving an RF communication-enabled integrated circuit (IC) data storage card.

2. The method of claim 1, wherein the electronic data representing energy management-related information further comprises electronic data representing real time energy management-related messages.

3. The method of claim 2, wherein the real time energy management-related messages further comprise real time messages regarding at least one of energy pricing information, energy usage information, energy account information, energy-related weather information, and energy-related security information.

4. The method of claim 1, wherein the RF communication-enabled IC data storage card further comprises at least one of a secure digital card (SD card), a micro-SD card, a CompactFlash card (CF card), a Universal Serial Bus (USB) storage device, and a network memory stick.

5. The method of claim 1, wherein the electronic display device further comprises a digital photo display device.

6. The method of claim 1, wherein the electronic display device further comprises a screensaver application on a computing device.

7. The method of claim 1, wherein the RF communication-enabled data storage card is integrated with the electronic display device.

8. The method of claim 7, wherein the electronic display device comprises at least one of a smartphone, a wireless computing device with a screen saver application, a RF communication-enabled PDA liquid crystal display (LCD), and a RF communication-enabled PDA docking station.

9. The method of claim 1, wherein the electronic data representing telemetry information further comprises electronic data representing at least one of localized telemetry information, local weather delivered from sensors, and energy management telemetry data from local loads such as meters.

10. The method of claim 1, further comprising receiving additional electronic data representing telemetry information from at least one of an energy meter, a thermostat, a solar panel system control, wind generator system control, a pool pump control, a water heater control.

11. The method of claim 1, wherein converting the received electronic data to a format displayable on the screen associated with the display device further comprises converting the received electronic data into a display of scrolling text and graphics.

12. The method of claim 1, wherein displaying the converted energy management-related information and telemetry information further comprises alternating between the display of the converted energy management-related information and telemetry information and pre-selected graphics or photographs.

13. The method of claim 1, wherein displaying the converted energy management-related information further comprises displaying the converted energy management-related information in the form of a ticker.

14. The method of claim 1, wherein displaying the converted telemetry information further comprises displaying the converted telemetry information in the form of at least one of a virtual thermostat and a virtual energy meter.

* * * * *